T. H. QUEEN.
ANIMAL RACK.
APPLICATION FILED AUG. 18, 1913.
1,191,345.
Patented July 18, 1916.
2 SHEETS—SHEET 2.
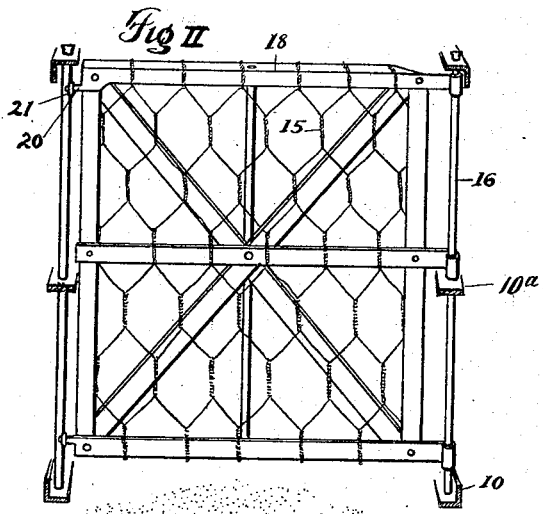
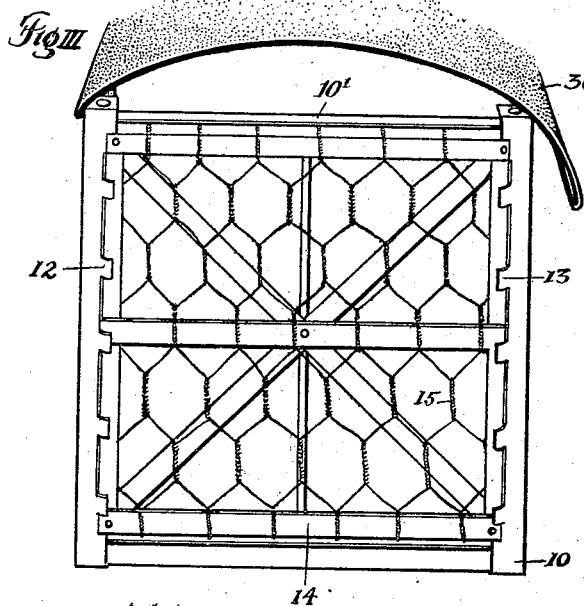
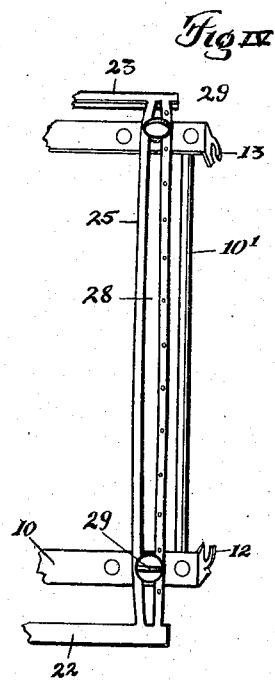
Witnesses:
Inventor:
Thomas H. Queen
By ... Atty.

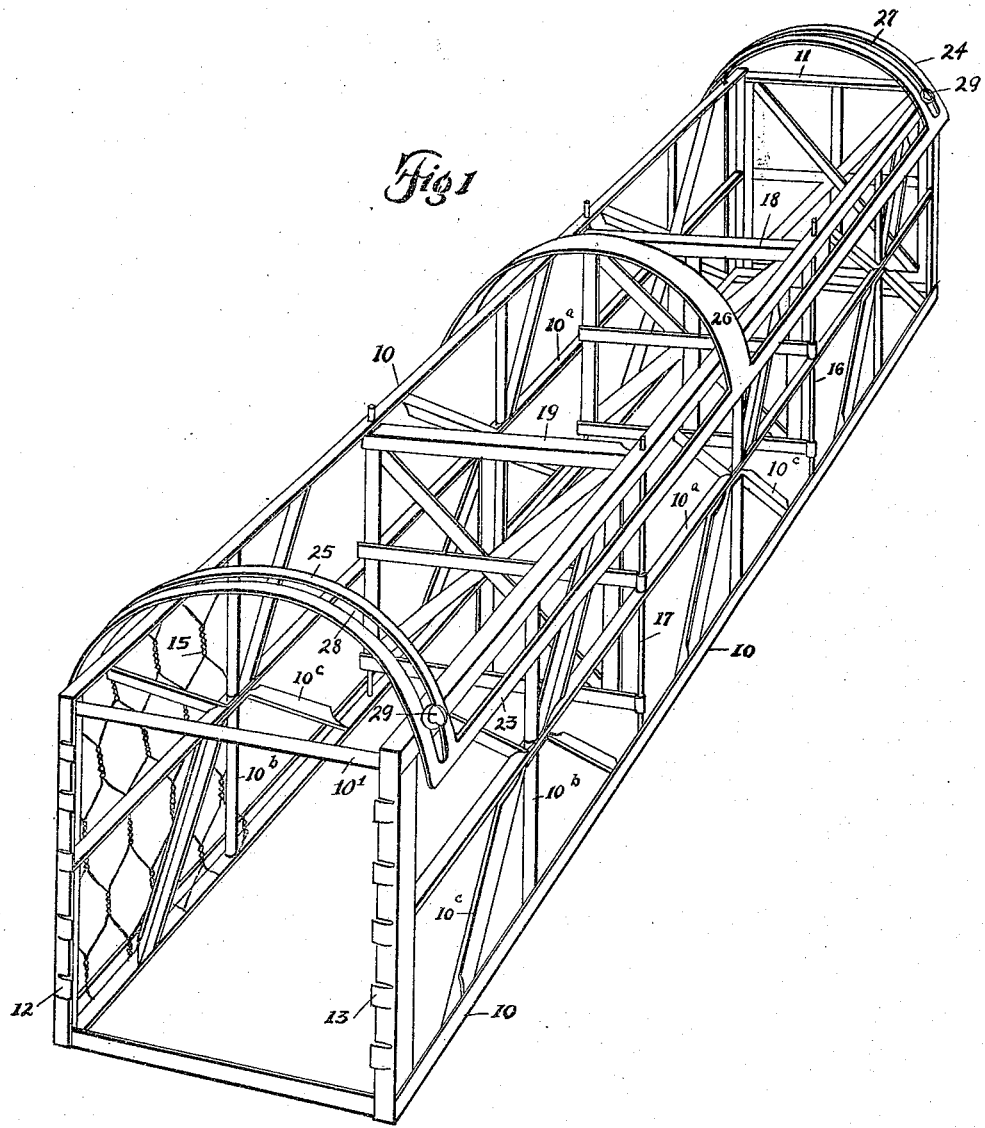

UNITED STATES PATENT OFFICE.

THOMAS H. QUEEN, OF NEW VIRGINIA, IOWA.

ANIMAL-RACK.

1,191,345.

Specification of Letters Patent. Patented July 18, 1916.

Application filed August 18, 1913. Serial No. 785,282.

*To all whom it may concern:*

Be it known that I, THOMAS H. QUEEN, a citizen of the United States, residing in New Virginia, county of Warren, and State of Iowa, have invented a new and useful Improvement in Animal-Racks, of which the following is a specification.

The object of this invention is to provide an improved construction for an animal rack adapted to be separated into compartments and provided with a laterally adjustable canopy.

A further object of this invention is to provide an improved frame for a rack adapted for the transportation of animals, whereby a maximum of ventilation and coolness is obtained.

My invention consists in the construction, arrangement and combination of elements hereinafter set forth, pointed out in my claims and illustrated by the accompanying drawings, in which—

Figure 1 is a perspective of the device with the canopy removed from its frame. Fig. 2 is a sectional elevation illustrating a gate employed in intermediate portions of the rack. Fig. 3 is a rear elevation of the device. Fig. 4 is a detail plan of the rear end portion of the device, the canopy being removed from its frame. Figs. 2, 3 and 4 are on a scale enlarged relative to Fig. 1.

In the construction of the device as shown a frame 10 is employed, in the form of a rectangular parallelepiped, and said frame preferably is constructed of angle iron. The frame 10 may be of any convenient size, but preferably is of such size as to be mounted on and carried by the ordinary wagon box. The frame 10 is reinforced by intermediate longitudinal members 10$^a$, intermediate uprights 10$^b$ and oblique braces 10$^c$ on its sides. The frame 10 is formed with a fixed front end 11. The rear uprights or posts of the frame 10 are spaced apart at their upper ends by transverse bar 10′ and are slit and bent to form keepers 12, 13. A rear end gate 14 is independently formed and is adapted to slide vertically within and be held in position by said keepers, as shown in Fig. 3. Wire mesh such as 15 preferably is fixed to the sides of the frame 10 and to the end members 11 and 14. The wire mesh 15 is shown only on portions of the frame 10, in Figure 1 of the drawing, to avoid confusion.

Pintle bars 16, 17 are mounted in upright position and spaced apart on one side of the frame 10 and gates 18, 19, in this instance two in number and preferably of skeleton form and covered with wire mesh 15, are hinged on said bars within the inclosure of the frame 10. The gates 18, 19 are adapted to divide the inclosure of the frame 10 into compartments for the purpose of separating animals to be transported in the rack, either arbitrarily or as to kind. For instance, a number of swine may be placed in each compartment, and the separation prevents undue crowding and trampling; or swine, calves, sheep, poultry and the like may be confined in the several compartments and separated by the gates 18, 19. The gates 18, 19 are provided with projecting lugs 20 (see Fig. 2) adapted to engage latches 21 pivoted on the side of the frame, whereby said gates may be held in closed position.

A canopy frame is composed of longitudinal members 22, 23, end members 24, 25 and a cross member 26 between said end members. The longitudinal members 22, 23 are approximately the same length as the length of the frame 10, preferably a trifle less, and the end members 24, 25 and cross member 26 are of materially greater length than the width of said frame. The end members 24, 25 and cross member 26 are bent, curved or bowed upwardly from the plane of the longitudinal members 22, 23. The end members 24, 25 of the canopy frame are formed with longitudinal slots 27, 28 extending throughout the major portions of their lengths. The canopy frame is mounted upon the frame 10 and set screws 29 are mounted through the slots 27, 28 and seated in the frame 10 at the upper corners thereof. The set screws 29 are adapted to hold the canopy frame in position relative to the frame 10, either in central position as shown in Fig. 1, or shifted laterally to one side or the other as illustrated in Fig. 3. A canopy or awning 30 is removably mounted on and fixed to the canopy frame, and may be composed of canvas or other suitable material. The canopy frame is shifted to one side or the other as indicated to provide a maximum of shade for the occupants of the rack.

The skeleton construction of the rack frame provides for thorough ventilation and tends to prevent overheating of the animals contained therein.

I claim as my invention—

1. An animal rack comprising a frame having spaced end posts of angle iron material each arranged to have a flange extending inwardly toward the other post, said flanges being provided with a plurality of slits along their edges to form keepers which are bent outwardly from the remaining portions of the flanges, and a gate slidably engaged between the keepers and the flanges of the end posts.

2. An animal rack comprising side walls each having upper, lower and intermediate longitudinal frame members formed with inwardly extending horizontal flanges, a fixed end wall connecting the side walls at one end, a movable end wall slidably engaged with the side walls at the opposite end, a plurality of pintle bars passing through the horizontal flanges of longitudinal frame members of one side wall, upright bars passing through the flanges of the frame members of the other side wall, and arranged opposite to the pintle bars, a gate hinged to each pintle bar and provided with projecting lugs on its free edge, and latches carried by the upright bars with which the lugs are adapted to engage.

THOMAS H. QUEEN.

Copies of this patent may be obtained for five cents each, by addressing the "Commissioner of Patents, Washington, D. C."